(12) United States Patent
Kaneko

(10) Patent No.: US 9,009,244 B2
(45) Date of Patent: Apr. 14, 2015

(54) IMAGE FORMING APPARATUS, AND CONTROL METHOD THEREOF

(71) Applicant: Canon Kabushiki Kaisha, Tokyo (JP)

(72) Inventor: Shuhei Kaneko, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 13/649,396

(22) Filed: Oct. 11, 2012

(65) Prior Publication Data

US 2013/0097258 A1 Apr. 18, 2013

(30) Foreign Application Priority Data

Oct. 13, 2011 (JP) ................... 2011-225735

(51) Int. Cl.
*G06F 15/16* (2006.01)
*H04L 12/64* (2006.01)
(52) U.S. Cl.
CPC .................. *H04L 12/6418* (2013.01)
(58) Field of Classification Search
USPC .................. 709/206, 203, 200, 229
See application file for complete search history.

(56) References Cited

U.S. PATENT DOCUMENTS

2009/0323915 A1\* 12/2009 Sasaki ................ 379/112.01
2010/0238493 A1\* 9/2010 Sako et al. ................ 358/1.15

FOREIGN PATENT DOCUMENTS

JP   2007-55124 A    3/2007
JP   2010-092158 A   4/2010

\* cited by examiner

*Primary Examiner* — El Hadji Sall
(74) *Attorney, Agent, or Firm* — Canon U.S.A., Inc. IP Division

(57) ABSTRACT

An image forming apparatus and method includes receiving a plurality of addresses for transmitting mail including URL of a web page provided by the image forming apparatus, transmitting the mail including the URL of the web page to the plurality of addresses, and delivering, in response to a download request from an external apparatus via the web page indicated by the URL, to the external apparatus a setup file of a device driver for the image forming apparatus registered in a storage region of the image forming apparatus.

8 Claims, 12 Drawing Sheets

FIG.5

| MAIL ADDRESS | UNIQUE ID | NOTIFICATION DATE AND TIME | DOWNLOAD DATE AND TIME | NUMBER OF TIMES OF DOWNLOAD |
|---|---|---|---|---|
| userA@test.co.jp | 6431 | 2011/1/14 | 2011/1/14 | 1 |
| userB@test.co.jp | 2676 | 2011/1/14 | 2011/1/28 | 3 |
| userC@test.co.jp | 9753 | 2011/3/15 | 2011/4/10 | 1 |

From: device@example.com
To: test@test.com
Subject: SETUP DRIVER DOWNLOAD
-----
YOU CAN DOWNLOAD THE PRINTER DRIVER YOU
HAVE REQUESTED FROM

802

801 — http://192.168.0.11:8000/iwma/drivers/UNIQUE ID

WHEN THE BROWSER IS OPENED, SELECT AND
DOWNLOAD AN APPROPRIATE DRIVER VIA THE SCREEN.

FIG.9

| xxxxxXXXX Management Agent | | | |
|---|---|---|---|
| DEVICE SERIAL No. ZZZ99999 | | | |
| MAIN MENU > DRIVER DOWNLOAD | | | |
| DRIVER DOWNLOAD | | DISPLAY UPDATE AND TIME: 2010/12/06 13:49:18 ↻ | |
| THIS IS A LIST OF PRINTER DRIVERS THAT CAN BE DOWNLOADED. CLICK [DOWNLOAD] TO DOWNLOAD A FILE. WHEN THE DOWNLOADED FILE IS EXECUTED, THE PRINTER DRIVER IS INSTALLED. | | | BACK TO MENU |
| LIST OF DRIVERS | | | |
| No. | DISPLAY NAME | DRIVER TYPE | VERSION | COMMENT | |
| 1 | Xxxxxx xX-XXX XXX45/XX51 XXXX | Xxxxxx XXXXX Printer Driver | 20.35 | | DOWNLOAD |
| 2 | Xxxxxx xX-XXX XXX45/XX51 XXXX | Xxxxxx XXXXX Printer Driver | 20.10 | FOR ADMINISTRATION | DOWNLOAD |
| 3 | Xxxxx xX-XXX XXX45/XX51 XXXX | Xxxxx XXXXX Printer Driver | 20.10 | FOR ADMINISTRATION WORK | DOWNLOAD |

901  902  903  904  905  906

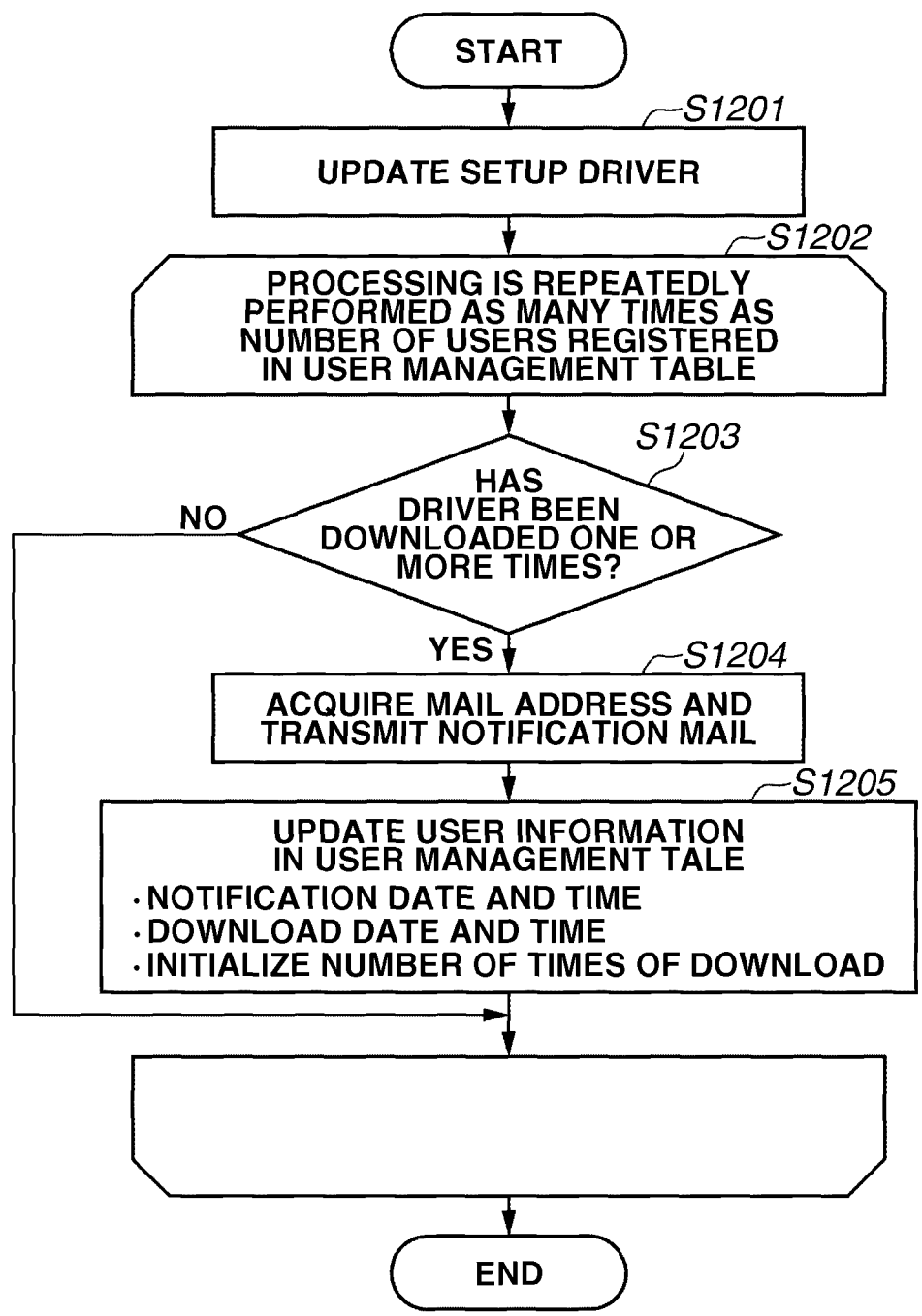

IMAGE FORMING APPARATUS, AND CONTROL METHOD THEREOF

BACKGROUND OF THE INVENTION

1. Field of the Invention

Aspects of the present invention relate to a technique for managing a setup file of a device driver for an image forming apparatus.

2. Description of the Related Art

In recent years, printers have become popular in company offices, and thus many people can easily perform printing. To perform printing from a personal computer (PC), a printer driver that controls printing and generates print data needs to be installed in the PC.

The printer driver is typically prepared for each operating system (OS) of the PC or each printer to be used, and is provided in a storage medium such as a compact disk read only memory (CD-RO) or a floppy disk (FD) packaged with the printer. Further, an administrator can typically acquire the latest version of the printer driver by downloading it from a web site provided by a printers' manufacturer.

Furthermore, an acquired printer driver and setting information to be used for installation are stored in a storage apparatus that is shared via a network, and a storage location is announced to general users so that the general users can use the printer. Based on the announcement, the general users install the printer driver onto the PC according to the information acquired from the storage location.

In recent years, it has become common for image forming apparatuses to deal with a plurality of printer drivers, such as LIPS, LIPSX, PCL, and etc., and thus one image forming apparatus can simultaneously operate the plurality of printer drivers.

Moreover, in recent years, utility software can change an initial state (standard setting value) after the printer driver has been installed, thereby providing a customized printer driver, which can be more conveniently used by the user.

As a conventional method for installing the printer driver, Japanese Patent Application Laid-Open No. 2010-092158 discusses a technique where an administrator generates setting information that an installer refers to as a definition file, and then the definition file and the installer are browsed from an execution file (hereinbelow, referred to as a "setup driver" to discriminate from the printer driver).

Further, a plurality of generated setup drivers is uploaded into the image forming apparatus, and then the user can directly install the printer driver from the image forming apparatus. As a conventional technique, Japanese Patent Application Laid-Open No. 2007-55124 discusses a technique where, when a resource of a network information peripheral device is changed, the change of the resource is automatically provided to the user who manages the resource and is affected by the change of the resource, such as an information processing apparatus.

However, even when the administrator generates the setup driver and notifies the users, all users do not always install the printer driver.

According to the conventional method for notifying the user of the resource change, since the user who has accessed the image forming apparatus is notified, a user who has downloaded the printer driver and a user who has not are not discriminated from each other. Thus, the resource change is also notified to the user who has not downloaded the printer driver.

As a solution, a method for memorizing users to whom a setup driver has been delivered in the image forming apparatus may be used, and notifying the users who have actually downloaded the setup driver among those users.

However, the users may include the user who has received a notification of the resource change by a method different from a usual method and has happened to download the printer driver. Since such a user is not a user that has been memorized (i.e., a user whose notification address is not registered in the image forming apparatus), the user cannot receive the notification of the resource change by the above-described method.

As described above, an appropriate system has not been established with which the user using the image forming apparatus can download the setup file of the device driver for the image forming apparatus.

SUMMARY OF THE INVENTION

Aspects of the present invention relate to an image forming apparatus with which a user using the image forming apparatus can download from a web page provided by the image forming apparatus a setup file of a device driver for the image forming apparatus registered in a storage region of the image forming apparatus.

According to an aspect of the present invention, an image forming apparatus includes a receiving unit configured to receive, through an input unit, a plurality of addresses for transmitting mail including a URL of a web page provided by the image forming apparatus, a notification unit configured to transmit the mail including the URL of the web page to the plurality of addresses received by the receiving unit, and a delivery unit configured to, in response to a download request from an external apparatus via the web page indicated by the URL, deliver to the external apparatus a setup file of a device driver for the image forming apparatus registered in a storage region of the image forming apparatus, wherein the addresses are input using an address book previously stored in the image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates stored in the image forming apparatus 101 according to an exemplary embodiment.

FIG. 8 illustrates an example of body text of a notification mail delivered by a management system according to an exemplary embodiment.

FIG. 9 illustrates an example of a driver download screen according to an exemplary embodiment.

FIG. 12 is a flowchart illustrating an example of processing for, when the setup driver stored in the image forming apparatus 101 is changed or updated, automatically notifying thereof to a user registered in the user management table 403, according to an exemplary embodiment.

DESCRIPTION OF THE EMBODIMENTS

Various exemplary embodiments, features, and aspects of the invention will be described in detail below with reference to the drawings.

Figure 1:
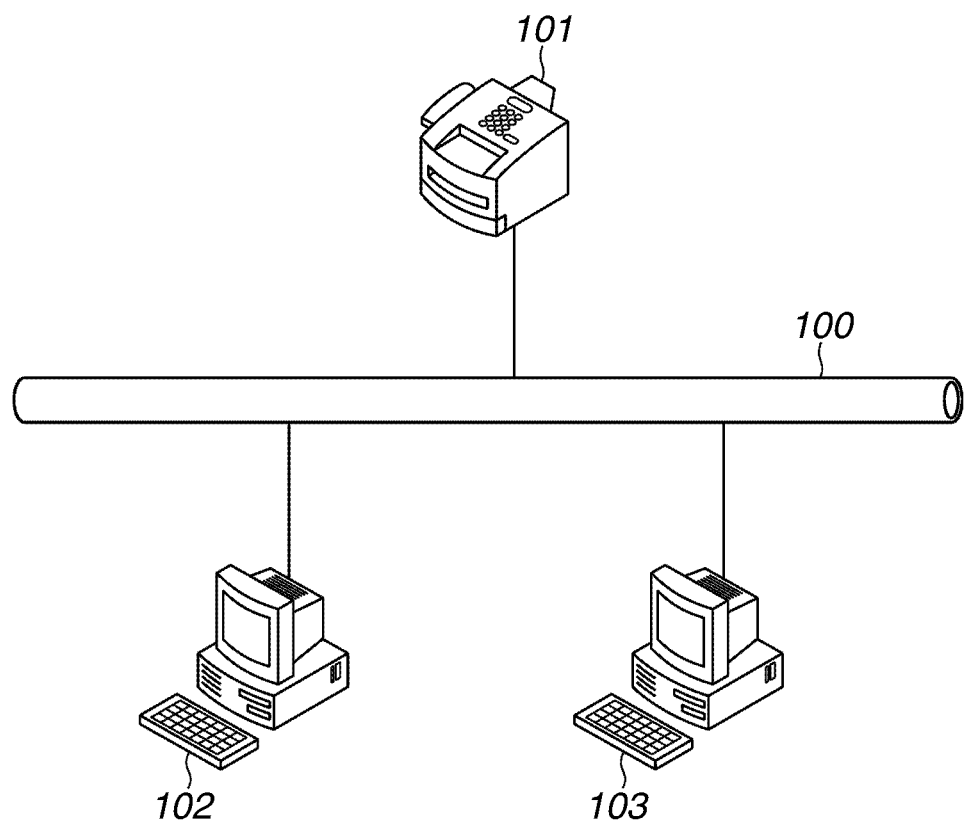
FIG. 1 is a block diagram illustrating an example of a configuration of an image forming apparatus management system according to an exemplary embodiment.

FIG. 1 is a block diagram illustrating an example of a configuration of an image forming apparatus management system (hereafter, also referred to as a "management system") according to an exemplary embodiment. Unless otherwise specified, as long as a function of the present invention is executed, a system may include a single device or a plurality of devices. Further, unless otherwise specified, as long as a function of the present invention is executed, the present invention can be applied to a system in which processing is performed by connecting such devices with each other via a network such as a local area network (LAN) and a wide area network (WAN).

In FIG. 1, an image forming apparatus 101 is connected to a network 100 via a network interface (not illustrated). Further, the image forming apparatus 101 analyzes a job including print data transmitted from information processing apparatuses 102 and 103 to convert the print data into an image for each page, and then print the image thereof.

The image forming apparatus 101 may use any method to print the image, such as a laser beam printer employing an electro-photographic process, an inkjet printer employing an inkjet process, or a printer employing a thermal transfer process.

In the exemplary embodiment, the information processing apparatuses 102 and 103 are personal client computers, and connected to the network 100 via a network cable such as Ethernet®. The information processing apparatuses 102 and 103 can perform various types of programs such as an application program, and each include a communication device that can communicate bi-directionally with other devices connected to the network 100.

Figure 2:
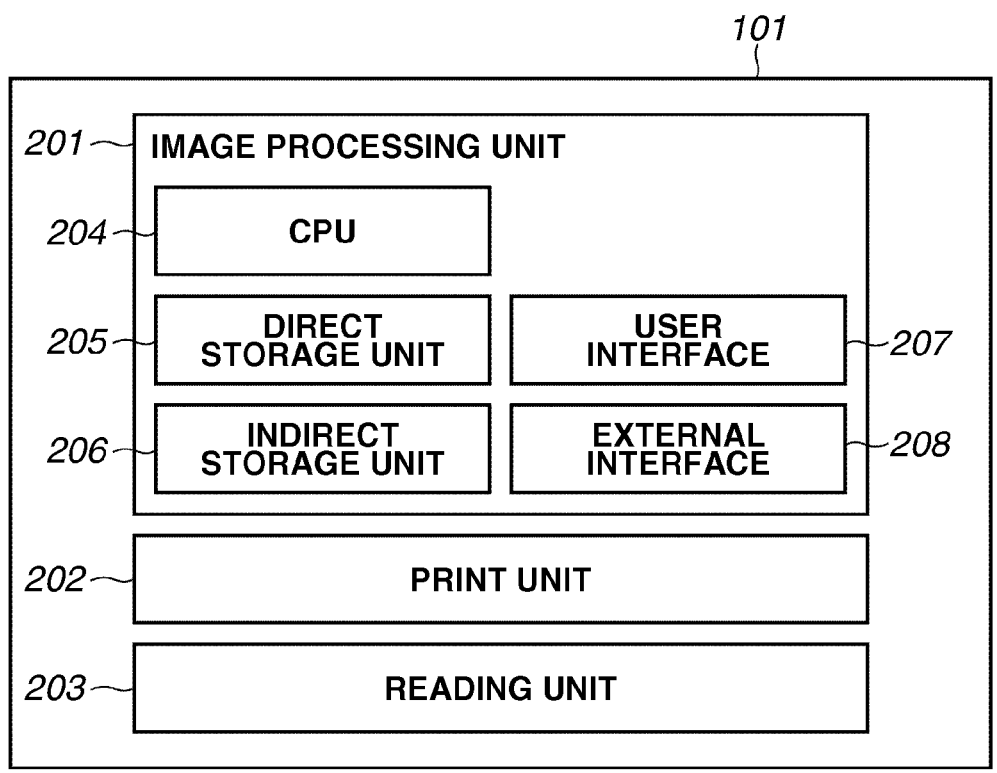
FIG. 2 is a block diagram illustrating an internal configuration of image forming apparatus 101.

FIG. 2 is a block diagram illustrating an internal configuration of the image forming apparatus 101. As illustrated in FIG. 2, the image forming apparatus 101 includes an image processing unit 201, a print unit 202, and a reading unit 203.

The image processing unit 201 includes a central processing unit (CPU) 204, a direct storage unit 205, an indirect storage unit 206, a user interface 207, and an external interface 208. The CPU 204 executes a predetermined program and gives instructions for various types of control of the image forming apparatus 101. The CPU 204 may be a multiprocessor.

The direct storage unit 205 is a work memory used when the CPU 204 executes a program, and the program to be executed by the CPU 204 is loaded into the direct storage unit 205. The direct storage unit 205 can be realized by a random access memory (RAM).

The indirect storage unit 206 stores application programs and a setup file of a device driver for the image forming apparatus 101. Various types of programs stored in the indirect storage unit 206 are moved to the direct storage unit 205 when the CPU 204 executes the program.

The setup file stored in the indirect storage unit 206 is used to install the device driver for controlling the image forming apparatus 101 from the information processing apparatuses 102 and 103 into the information processing apparatuses.

The above-described device driver (hereafter, referred to as a "driver") is not limited to the printer driver, but may be any device driver, for example, a scanner driver when the image forming apparatus 101 has a scanner function and a fax driver when the image forming apparatus 101 has a facsimile function, as long as the device driver works for the image forming apparatus 101.

The indirect storage unit 206 can be realized by a solid state drive (SSD) or a hard disc drive (HDD).

Driver installation processing performed by the image forming apparatus 101 will be described below.

In the present exemplary embodiment, in the image forming apparatus 101, driver installation software is operating for receiving a driver installation request from the information processing apparatus 102.

The driver installation software can receive the driver installation request from an apparatus connected via the network using a communication protocol such as a hypertext transfer protocol (HTTP). When receiving the driver installation request from the information processing apparatus 102, the driver installation software delivers the setup driver stored in the image forming apparatus 101 to the information processing apparatus 102.

Returning to FIG. 2, the user interface 207 is used to receive processing requests from a user. It may be referred to as an "operation panel". The user interface 207 receives a signal according to an instruction input by the user via a key or a touch panel.

The external interface 208 can receive data from an external apparatus and transmit data thereto. For example, the external apparatus may be an external storage apparatus such as an external HDD connected to the image forming apparatus 101 via an external universal serial bus (USB), or a host computer connected to the image forming apparatus 101 via the network. The image forming apparatus 101 can communicate with the information processing apparatus 102 serving as a client computer via the network 100.

Figure 3:
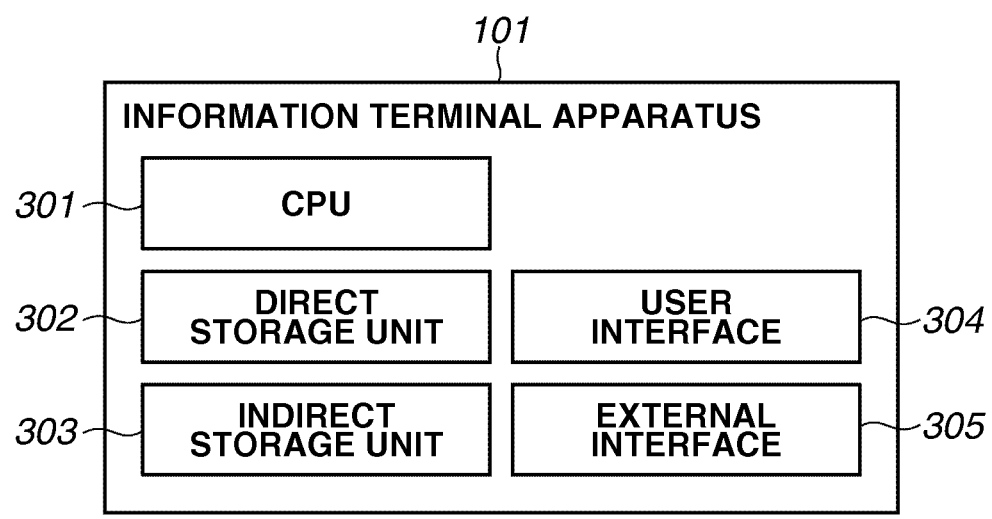
FIG. 3 is a block diagram illustrating an internal configuration of an information processing apparatuses 102 and 103.

FIG. 3 is a block diagram illustrating the internal configurations of the information processing apparatuses 102 and 103. As illustrated in FIG. 3, the information processing apparatuses 102 and 103 each include a CPU 301, a direct storage unit 302, an indirect storage unit 303, a user interface 304, and an external interface 305. The CPU 301 executes a predetermined program and gives instructions for various types of control of the information processing apparatuses 102 and 103.

The direct storage unit 302 is a work memory used when the CPU 301 executes the program, which is loaded into the direct storage unit 302. The direct storage unit 302 is composed of a RAM.

The indirect storage unit 303 stores application programs and various types of programs including an operating system (OS). The various types of programs stored in the indirect storage unit 303 are moved to the direct storage unit 302 when the CPU 301 executes the programs. Further, the indirect storage unit 303 stores various types of data such as print data and document data, details of which will be described below. The indirect storage unit 303 includes a ROM or a HDD.

The user interface 304 receives a processing request from the user. For example, the user interface 304 receives a signal according to an instruction input by the user via a keyboard or a mouse. The external interface 305 is connected to the network 100 and enables the information processing apparatuses 102 and 103 to communicate with other apparatuses connected thereto.

According to the present exemplary embodiment, the information processing apparatuses 102 and 103 include a web browser. The web browser can access a web server connected via the network using the communication protocol such as the HTTP.

Figure 4:
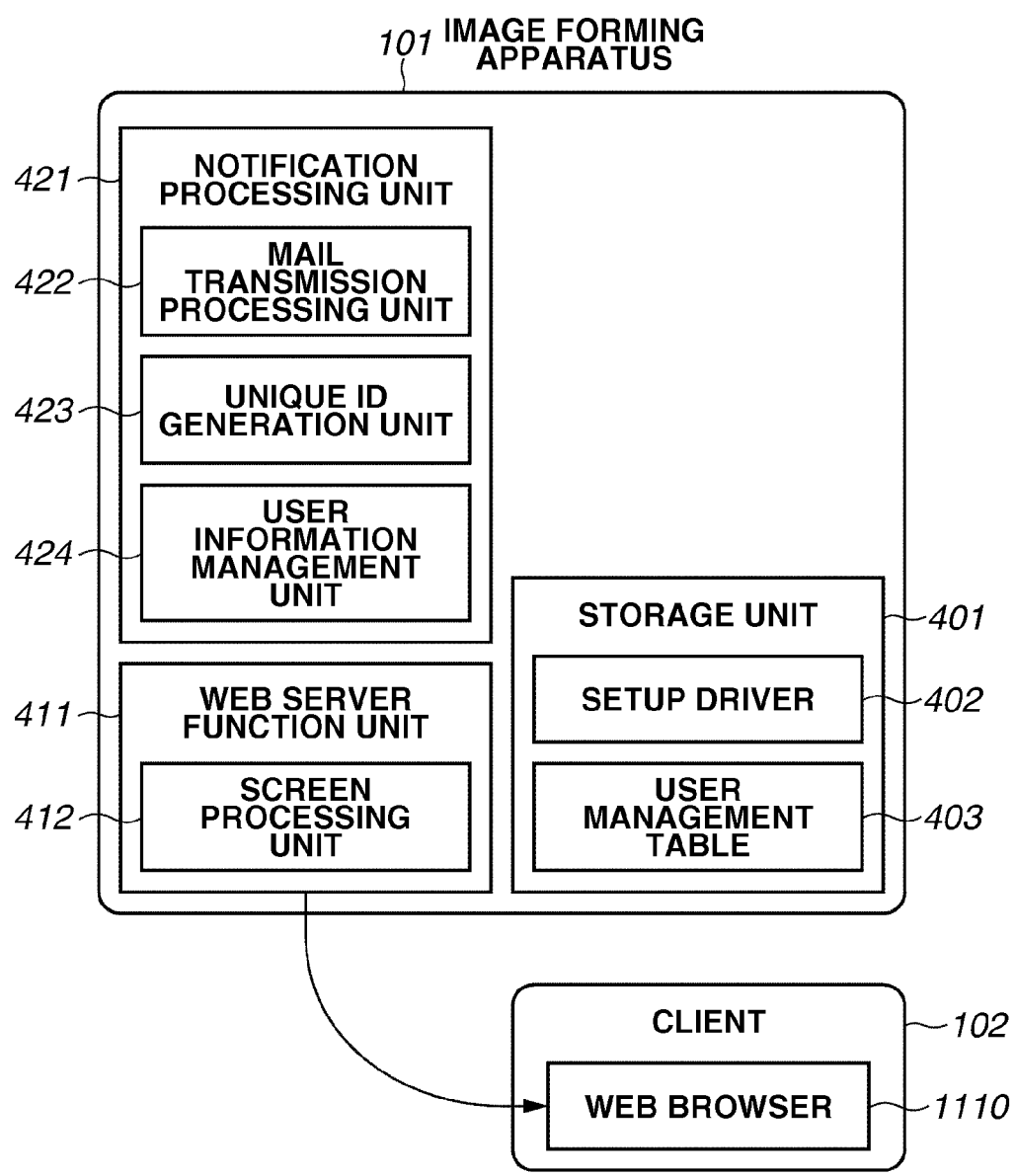
FIG. 4 illustrates an example of an image forming apparatus management system according to an exemplary embodiment of the invention.

FIG. 4 illustrates an example of an image forming apparatus management system according to the present exemplary embodiment. A storage device will be described as a storage unit included in the image forming apparatus for the sake of simple descriptions.

As illustrated in FIG. 4, the image forming apparatus 101 includes a storage unit 401, a web server function unit 411, and a notification processing unit 421.

The storage unit 401 is a storage region storing a setup driver 402 and a user management table 403 illustrated in FIG. 5. The storage unit 401 may store, in addition to the setup driver 402 and the user management table 403, an address table, link information about the setup driver uploaded into other devices, and information about setting values of the image forming apparatus 101. The storage unit 401 may be included in the indirect storage unit 206 or in an external storage device that can be accessed by the image forming apparatus 101.

As illustrated in FIG. 5, in the user management table 403, a user's mail address 501, a unique ID 502 allocated to each mail address, a notification date and time 503 notified to the mail address, a download date and time 504 when the setup driver 402 to which the unique ID is allocated is downloaded from a uniform resource locator (URL), and the number of times of download 505 for downloading the setup driver 402 from the URL are associated with one another to be registered.

A web server function unit 411 operates as the web server and provides a client with various types of web pages including a driver download screen and a notification destination registration screen illustrated in FIGS. 9 and 10 and described below. The web server function unit 411 can be realized when the CPU 204 of the image forming apparatus 101 loads the computer-readable program recorded in the indirect storage unit 206 into the direct storage unit 205 and executes it. The web server function unit 411 includes a screen processing unit 412.

Figure 10:
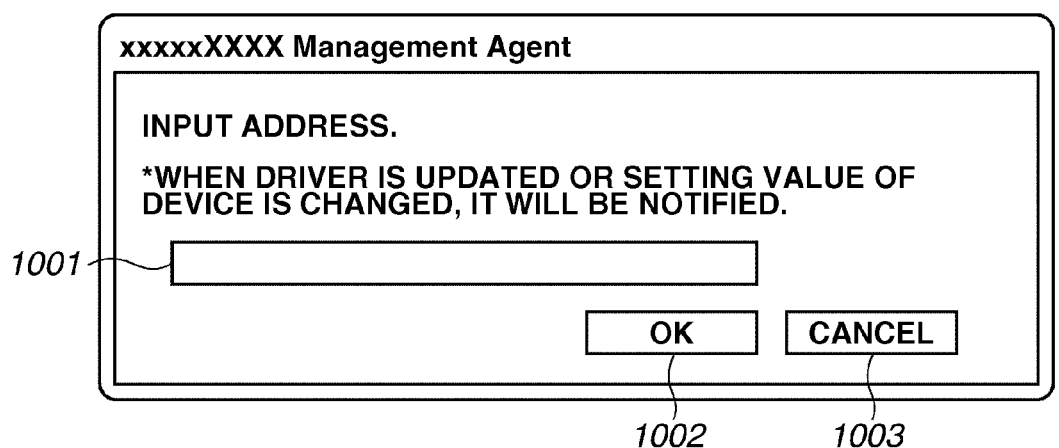
FIG. 10 illustrates an example of a notification destination registration screen according to an exemplary embodiment.

When the user selects a download button via a driver download screen (e.g., FIG. 9), the screen processing unit 412 switches display/non display of the notification destination registration screen (e.g., as illustrated in FIG. 10) according to information registered in the user management table 403. The screen processing unit 412 acquires information about the unique ID from the URL of an access source.

A notification processing unit 421 performs processing of changing or updating notification. The notification processing unit 421 can be realized when the CPU 204 of the image forming apparatus 101 loads the computer-readable program recorded in the indirect storage unit 206 into the direct storage unit 205, and executes it. The notification processing unit 421 includes a mail transmission processing unit 422, a unique ID generation unit 423, and a user information management unit 424.

The mail transmission processing unit 422 delivers a notification mail to the user triggered by a user's request via the user interface 207 or information about changing/updating the setup driver. The unique ID generation unit 423 generates the unique ID allocated to the URL described in the body text of the mail when the notification mail is delivered to the user.

The user information management unit 424 manages information about the user using the management system. More specifically, the user information management unit 424 records/acquires the information into/from the user management table 403.

The information processing apparatus 102 (103) includes a web browser 1110. The web browser 1110 operates as a client, and accesses the web server function unit 411 to acquire from the web server function unit 411 various types of web pages, described below, including the driver download screen and the notification destination registration screen illustrated in FIGS. 9 and 10.

The web browser 1110 can be realized when the CPU 301 of the information processing apparatus 102 (103) loads the computer-readable program recorded in the indirect storage unit 303 into the direct storage unit 302, and executes the program.

FIG. 5 illustrates an example of the user management table 403 stored in the image forming apparatus 101 according to the present exemplary embodiment.

The user information about the user is registered in the user management table 403 using the management system. According to the present exemplary embodiment, the user management table 403 includes information about the mail address 501, the unique ID 502, the notification date and time 503, the download date and time 504, and the number of times of download 505.

The mail address 501 is an address to which the management system delivers the notification mail. The unique ID 502 is a unique ID allocated for each mail address 501. The notification date and time 503 is the date and time when the notification mail is delivered (mail transmission date and time) using the management system.

The download date and time 504 is the date and time when the user downloads the driver from the URL described in the notification mail. The image forming apparatus 101 can determine, based on the unique ID 502, which user has accessed thereto.

The number of times of download 505 is the number of times of download of the driver from the URL performed by the user. The number of times of download 505 is initialized to "0" at a timing when the user information management unit 424 records the notification date and time 503.

Figure 6:
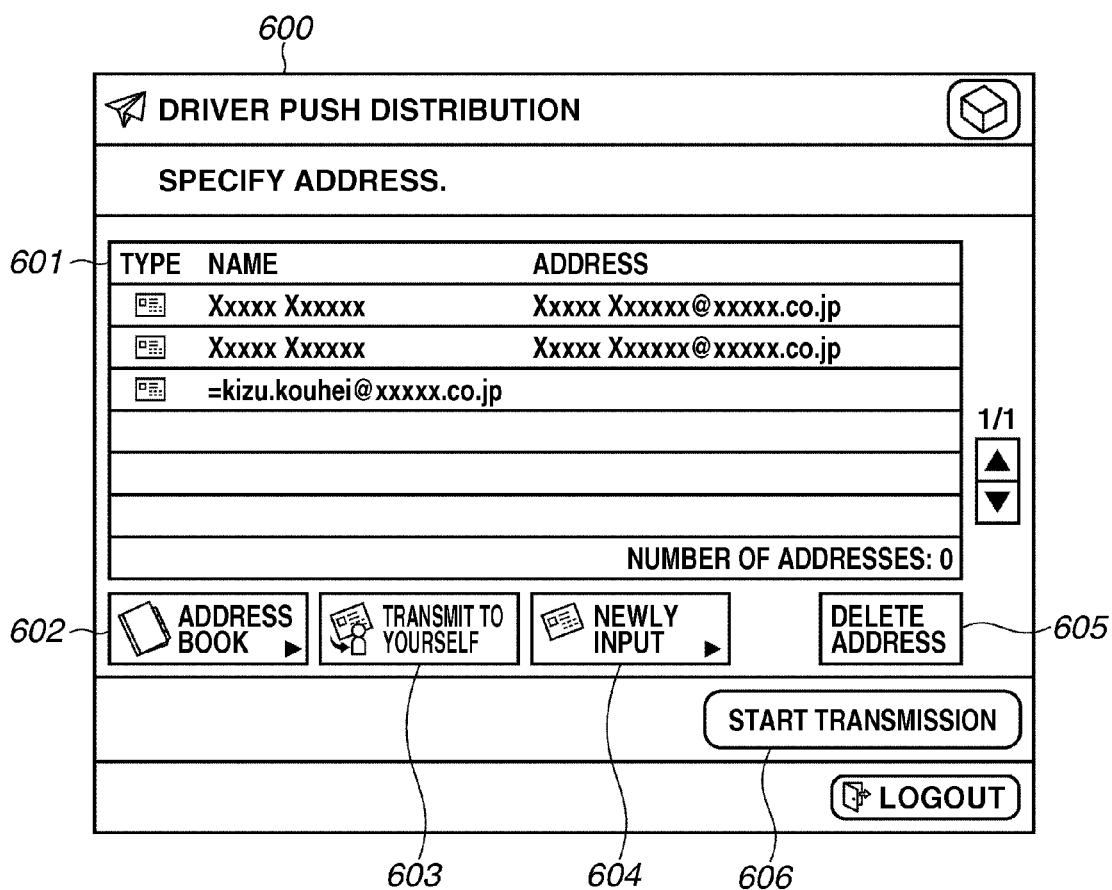
FIG. 6 illustrates an example of a driver download information delivery screen according to an exemplary embodiment.

FIG. 6 illustrates an example of a driver download information delivery screen displayed on the operation panel of the image forming apparatus 101 for realizing a driver delivery function provided by the image forming apparatus 101 according to the present exemplary embodiment.

In FIG. 6, a driver download information delivery screen 600 is displayed on the operation panel (user interface 207) of the image forming apparatus 101. When the user specifies the mail address on the driver download information delivery screen 600 and selects a "transmission start" button 606, the mail transmission processing unit 422 transmits URL information for accessing the driver download screen illustrated in FIG. 9 to the specified address.

The driver download information delivery screen 600 displays an address list 601, an "address book" button 602, a "transmit to yourself" button 603 a "newly input" button 604, an "address delete" button 605, and a "transmission start" button 606.

The address list 601 displays a list of the mail addresses specified as the notification destination by the "address book" button 602, the "transmit to yourself" button 603, and the "newly input" button 604. This list displays a type of the address, and a name and address thereof.

The "address book" button 602 is used to select a mail address (not illustrated) from an address book, or enables the address to be input from the address book. When the user selects the "address book" button 602, the notification processing unit 421 displays the address book screen (not illustrated) on the user interface 207, and when the user selects the mail address from the address book, the notification processing unit 421 adds the mail address to the address list 601.

The "transmit to yourself" button 603 is used to add a user's mail address (login user) from the login information to the address list 601. When the user selects the "transmit to yourself" button 603, the notification processing unit 421 acquires the user's mail address from the login information about the user, and then adds the mail address to the address list 601.

The "newly input" button 604 is used to directly input a mail address. When the user selects the "newly input" button 604, the notification processing unit 421 displays a keyboard screen (not illustrated) to allow the user to directly input a mail address, and then adds the mail address to the address list 601.

The "address delete" button 605 is used to delete the mail address selected from the address list 601. When the user selects the "address delete" button 605 in a state where an address in the address list 601 is selected, the notification processing unit 421 deletes the selected address from the address list 601.

The "transmission start" button 606 is used to deliver the driver download information to the mail address in the address list. When the user selects the "transmission start" button 606, the notification processing unit 421 delivers the notification mail in which the URL of the driver download page is written to the mail address registered in the address list 601.

Figure 7:
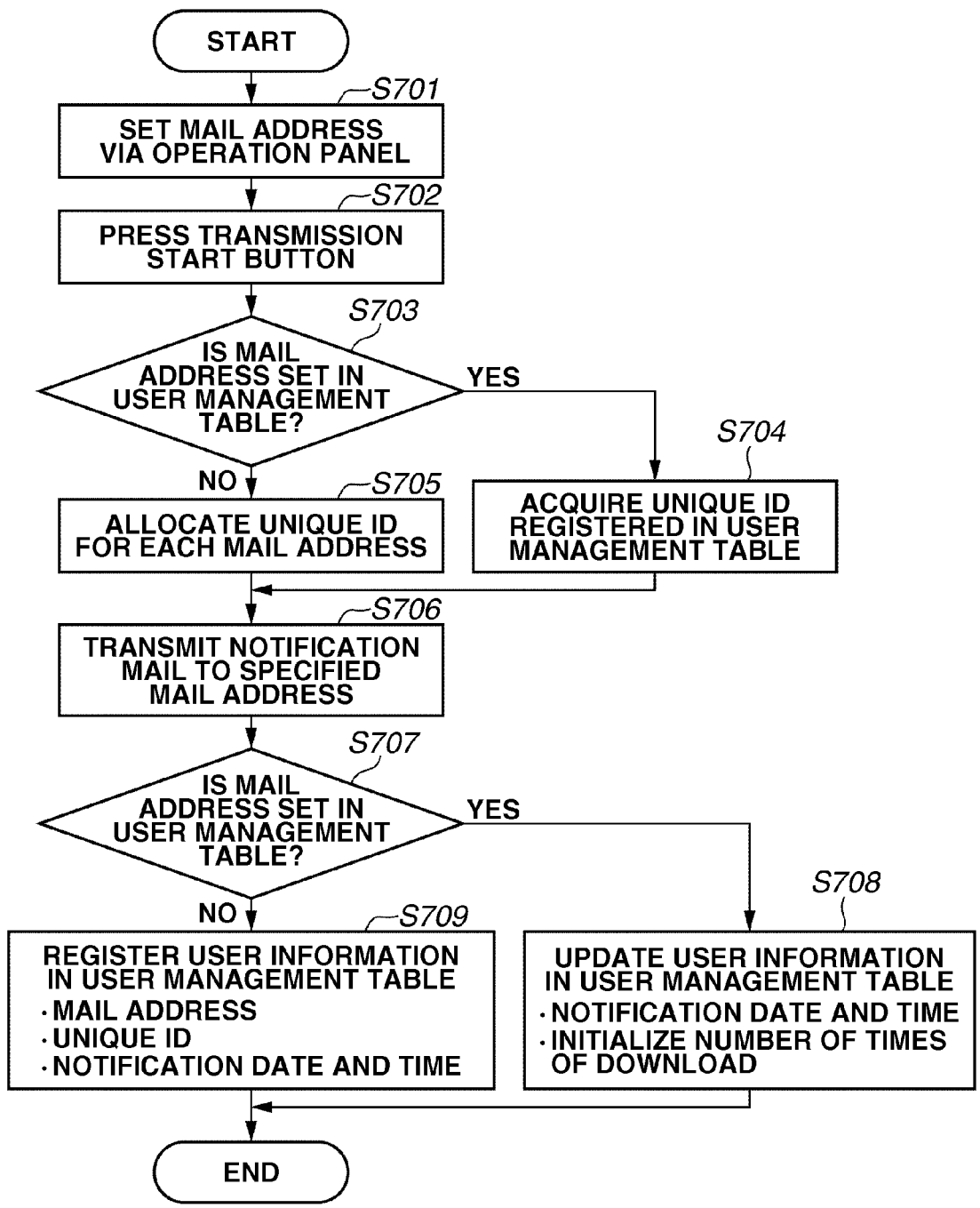
FIG. 7 is a flowchart illustrating an example of processing from setting an address via an operation panel of the image forming apparatus 101 to delivering mail according to an exemplary embodiment.

FIG. 7 is a flowchart illustrating an example of processing from setting the address via the operation panel of the image forming apparatus 101 to delivering the mail according to the present exemplary embodiment. The processing of the flowchart can be realized when the CPU 204 of the image forming apparatus 101 loads the computer-readable program recorded in the indirect storage unit 206 into the direct storage unit 205, and executes the program.

In step S701, when the notification processing unit 421 detects that the user has set a mail address of a destination for delivering the driver down load information in the address list 601 in the driver download information delivery screen 600 displayed on the user interface 207 of the image forming apparatus 101, the processing proceeds to step S702.

In step S702, when the notification processing unit 421 detects that the user selects the "transmission start" button 606 on the driver download information delivery screen 600, the processing proceeds to step S703. The notification processing unit 421 performs processing in steps S703 to S709 for each mail address set in the step S701.

In step S703, the notification processing unit 421 determines whether the mail address set in the step S701 is registered in the user management table 403. When it is determined that the mail address set in the step S701 is registered in the user management table 403 (YES in step S703), the processing proceeds to step S704.

In step S704, the notification processing unit 421 acquires the unique ID 502 allocated to the mail address set in the step S701 from the user management table 403, and the processing proceeds to step S706.

On the other hand, when it is determined that the mail address set in step S701 is not registered in the user management table 403 (NO in step S703), the processing proceeds to step S705.

In step S705, the unique ID generation unit 423 of the notification processing unit 421 allocates a unique ID to the mail address set in step S701, and the processing proceeds to step S706.

In step S706, the mail transmission processing unit 422 of the notification processing unit 421 delivers the notification mail (e.g., FIG. 8) of the driver download information to the mail address set in the step S701. The mail transmission processing unit 422 describes in the notification mail the URL information in which the information about the unique ID 502 is embedded, when the notification mail is transmitted.

In step S707, the notification processing unit 421 determines whether the mail address set in the step S701 is registered in the user management table 403.

When it is determined that the mail address set in the step S701 is registered in the user management table 403 (YES in step S707), the processing proceeds to step S708.

In step S708, the notification processing unit 421 updates the notification date and time 503 and the number of times of download 505 of the information registered in the user management table 403. The number of times of download 505 is initialized to "0", and then the processing of the flowchart ends.

On the other hand, when it is determined that the mail address set in step S701 is not registered in the user management table 403 (NO in step S707), the processing proceeds to step S709.

In step S709, the notification processing unit 421 registers the mail address 501 set in step S701, the unique ID 502 allocated in the step S705, and the notification date and time 503 in the user management table 403. The number of times of download 505 is set to an initial value of "0", and then the processing of the flowchart ends.

As described in the present exemplary embodiment, the number of times of download 505 of the driver registered in the user management table 403 is initialized to "0" when the driver download information is notified, so that it can be determined whether the user has downloaded the driver that has been newly uploaded or updated after the initialization. The number of times of download 505 of the driver is incremented when the driver is downloaded.

FIG. 8 illustrates an example of body text of a notification mail delivered by a management system according to the present exemplary embodiment.

As illustrated in FIG. 8, in a body text 800 of the notification mail transmitted in step S706 illustrated in 7, a URL 801 illustrated in FIG. 8 of the web page (more specifically, driver download page) provided by the image forming apparatus 101 is described. A unique ID 802 illustrated in FIG. 8 is added (allocated) to the URL.

According to the present exemplary embodiment, the unique ID is allocated to the URL in the mail to be notified and registered as the user information so that, when the driver is downloaded from the URL, the image forming apparatus 101 can know which user has performed the download.

FIG. 9 illustrates an example of the driver download screen according to the present exemplary embodiment. When the user who has received the notification mail accesses the web server function unit 411 of the image forming apparatus 101 from the web browser 1110 of the information processing apparatus 102 using the URL described in the notification mail, the driver download screen is displayed on a display unit of the information processing apparatus 102.

On the driver download screen, a list of the setup drivers uploaded into the image forming apparatus 101 is displayed with a "No." 901, a "display name" 902, a "driver type" 903, a "version" 904, a "comment" 905, and a "download" button 906.

The "No." 901 displays a slot number of a setup driver that has been uploaded. The "display name" 902 displays a character string registered when the administrator uploads the setup driver.

The "driver type" 903 displays a character string of a driver type registered when the administrator uploads the setup driver. The "version" 904 displays a character string of version information about the setup driver registered when the administrator uploads the setup driver. The "comment" 905 displays a character string of a comment registered when the administrator uploads the setup driver.

When the user selects the "download" button 906 of any line, the web browser 1110 displays the download dialog (not illustrated), communicates with the screen processing unit 412 of the web server function unit 411 (to request installation of the driver), and then downloads the setup driver having a corresponding upload number into the download directory.

FIG. 10 illustrates an example of a notification destination registration screen according to the present exemplary embodiment. This notification destination registration screen is displayed by control of the screen processing unit 412 when a "down load" button 906 on the driver download screen illustrated in FIG. 9 included in the image forming apparatus 101 is selected and when the number of times of download 505 registered in the user management table 403 is one or more.

As illustrated in FIG. 10, the notification destination registration screen simultaneously displays a mail address input box 1001, an "OK" button 1002, and a "cancel" button 1003.

On the notification destination registration screen, a list of the mail addresses registered in the user management table 403 may be displayed and a button for checking whether the user's mail address has been already registered may be provided.

The mail address input box 1001 is a text box into which the user inputs the mail address. When the user selects the "OK" button 1002, the mail address input into the text box is registered in the user management table 403. Further, when the user selects the "cancel" button 1003, the mail address is not registered.

According to the present exemplary embodiment, the user who downloads the driver from the same delivered URL for a second time or more is dealt with as a user who is not registered in the user management table 403. This is because there is a user who accesses the driver download screen using the notification mail transferred from another user, without using the management system.

The user described above cannot receive the notification of changing the resource or changing the setup driver, which is updated by the administrator, since the mail address 501 is not registered in the user management table 403, even if the user downloads the setup driver from the URL. Thus, the screen processing unit 412 displays the notification destination registration screen illustrated in FIG. 10 for the user who downloads the driver for the second time or more, and registers in the user management table 403 the user information to which the mail address is input.

With this arrangement, the user who downloads the driver without using the management system is also registered. Thus, to such a user, when the driver is changed or updated after the user is registered, the notification mail can be delivered to the user.

Figure 11:
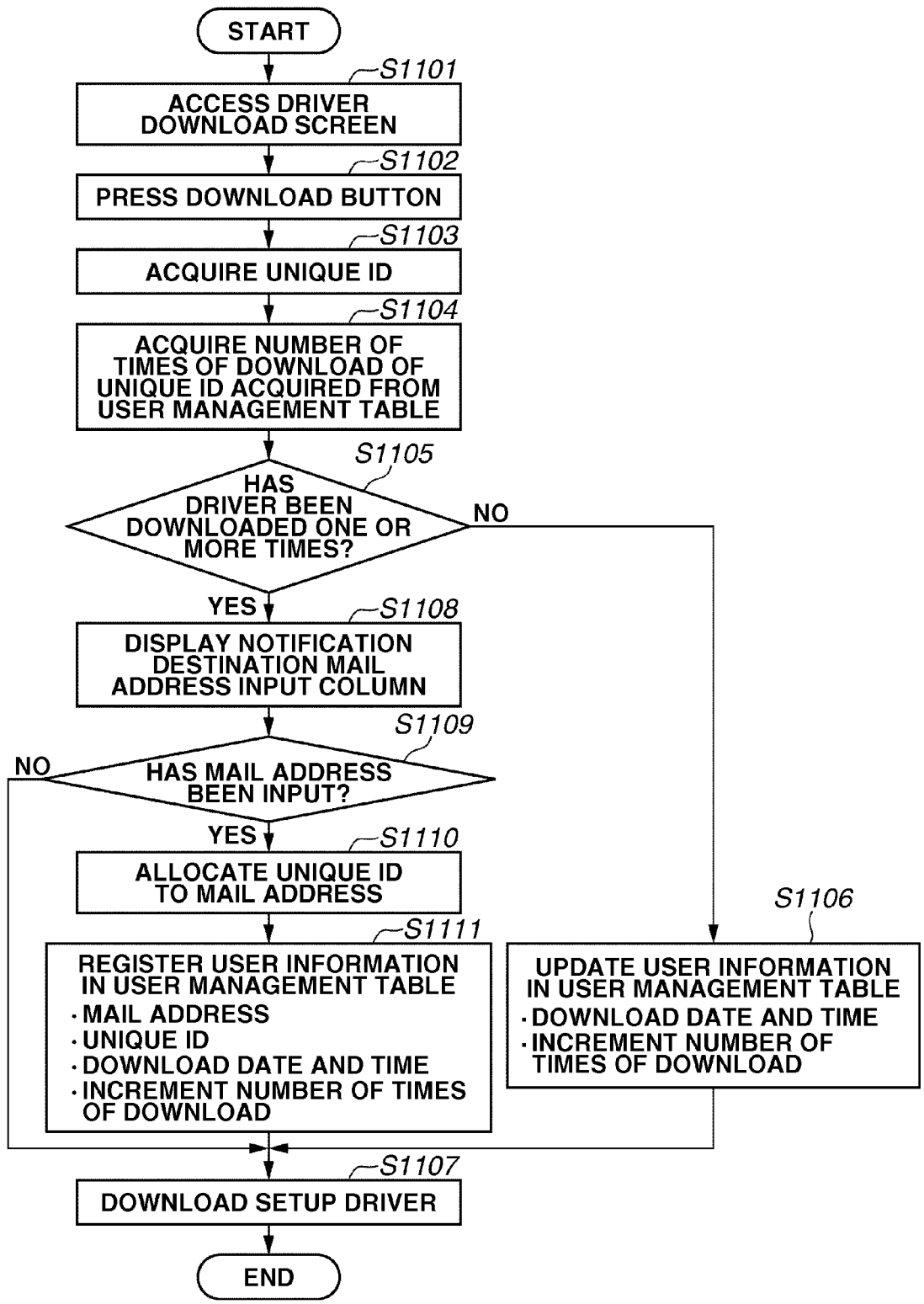
FIG. 11 is a flowchart illustrating an example of processing from accessing a driver download screen held by the image forming apparatus 101 to downloading a setup driver according to an exemplary embodiment.

FIG. 11 is a flowchart illustrating an example of processing from accessing the driver download screen stored in the image forming apparatus 101 to downloading the setup driver according to the present exemplary embodiment. The processing of the flowchart can be realized when the CPU 204 of the image forming apparatus 101 loads the computer-readable program recorded in the indirect storage unit 206 into the direct storage unit 205, and executes the program.

In step S1101, when the web server function unit 411 detects that the user accesses the driver download screen illustrated in FIG. 9 based on the URL information transmitted by the notification mail from the web browser 1110, the web server function unit 411 transmits the driver download screen to the web browser 1110, and the processing proceeds to step S1102.

In step S1102, when the web server function unit 411 receives the driver installation request (download request) from the web browser 1110 when the user selects the "down load" button 906 via the driver download screen illustrated in FIG. 9, the processing proceeds to step S1103.

In step S1103, the screen processing unit 412 of the web server function unit 411 acquires the unique ID allocated to the URL on the driver download screen, and the processing proceeds to step S1104.

In step S1104, the screen processing unit 412 acquires from the user management table 403 the information about the number of times of download 505 in association with the unique ID 502 acquired in step S1103, and the processing proceeds to step S1105.

In step S1105, the screen processing unit 412 determines whether the number of times of download 505 acquired in step S1104 is greater than or equal to one. When the number of times of download 505 is greater than or equal to one, the download has been already performed and is to be performed for the second time or more. On the other hand, when the number of times of download 505 is "0", the download has not yet been performed.

When it is determined that the number of times of download 505 acquired in step S1104 is not greater than or equal to one ("0") (NO in step S1105), the processing proceeds to step S1106.

In step S1106, the screen processing unit 412 updates the information registered in the user management table 403. The download date and time 504 is recorded, and the number of times of download 505 is incremented. Then, the processing proceeds to step S1107.

On the other hand, when it is determined that the number of times of download 505 acquired in the step S1104 is greater than or equal to one (YES in step S1105), the screen processing unit 412 determines that the download is requested by the user who is not registered in the user management table 403, and the processing proceeds to step S1108.

In step S1108, the screen processing unit 412 transmits the notification destination registration screen illustrated in FIG. 10 to the web browser 1110 and controls the web browser 1110 to display the notification destination registration screen thereon.

In a state where the mail address is input in the mail address input box 1001 on the notification destination registration screen illustrated in FIG. 10, when the "OK" button 1002 is selected, the web browser 1110 transmits the mail address input into the mail address input box 1001 to the screen processing unit 412. When the "cancel" button 1003 is selected, the web browser 1110 transmits a notification that the screen processing unit 412 that no mail address has been input.

In step S1109, the screen processing unit 412 determines whether the mail address has been input based on whether the screen processing unit 412 has received the mail address from the web browser 1110 or the information notifying that no mail address has been input.

When the screen processing unit 412 receives no mail address from the web browser 1110 (when screen processing unit 412 receives the information notifying that no mail address has been input), the screen processing unit 412 determines that no mail address has been input (NO in step S1109), and the processing proceeds to step S1107.

On the other hand, when the screen processing unit 412 receives the mail address from the web browser 1110 within a predetermined time, the screen processing unit 412 determines that the mail address has been input (YES in step S1109), and the processing proceeds to step S1110.

In step S1110, the screen processing unit 412 allocates the unique ID to the mail address received from the web browser 1110 (mail address input via the notification destination registration screen illustrated in FIG. 10), and the processing proceeds to step S1111.

In step S1111, the screen processing unit 412 registers the user information in the user management table 403. The mail address 501 received in step S1109, the unique ID 502 allocated in step S1110, the download date and time 504 (present date and time), and the number of times of download 505 (once) are registered in the user management table 403. Then, the processing proceeds to step S1107.

In step S1107, the screen processing unit 412 transmits the setup driver corresponding to the URL to the web browser 1110, and controls the information processing apparatus to download the setup driver, and then the processing of the flowchart ends.

FIG. 12 is a flowchart illustrating an example of processing for, when the setup driver stored in the image forming apparatus 101 according to the present exemplary embodiment is changed or updated, automatically notifying thereof to the user registered in the user management table 403. The processing of the flowchart can be realized when the CPU 204 of the image forming apparatus 101 loads the computer-readable program recorded in the indirect storage unit 206 into the direct storage unit 205, and executes it.

In step S1201, when the notification processing unit 421 detects that the setting information about the image forming apparatus 101 is changed or the setup driver is updated by the administrator, the processing proceeds to step S1202.

In step S1202, the notification processing unit 421 repeatedly, sequentially performs the processing from step S1203 to step S1204 as many times as the number of pieces of the user information registered in the user management table 403.

In step S1203, the notification processing unit 421 acquires one piece of the user information that has not processed from among the user information registered in the user management table 403 (hereinbelow, referred to as "current user information"), and determines whether the number of times of download 505 of the driver corresponding to the current user information is greater than or equal to one.

When it is determined that the number of times of download 505 of the driver corresponding to the current user information is not greater than or equal to one (NO in step S1203), the processing proceeds to the next user information.

On the other hand, when it is determined that the number of times of download 505 of the driver corresponding to the current user information is greater than or equal to one (YES in step S1203), the processing proceeds to step S1204.

In step S1204, the mail transmission processing unit 422 of the notification processing unit 421 acquires the mail address 501 from the current user information, transmits the notification mail to the mail address, and then the processing proceeds to step S1205.

In step S1205, the notification processing unit 421 updates the current user information in the user management table 403. The notification date and time 503 of the current user information is updated to the present date and time, and the number of times of download 505 is initialized to "0". Then, the processing proceeds to the next user information.

When the notification processing unit 421 determines that the processing from step S1203 to step S1204 is completed as many times as the number of pieces of the user information registered in the user management table 403 (for all registered user information), the notification processing unit 421 ends the processing of the flowchart.

In addition to the present exemplary embodiment, according to the information registered in the user management table 403, whether to notify or not to notify may be switched. For example, if the user whose number of times of download 505 is "0" when the notification is performed, it is determined that the user does not use the image forming apparatus 101 any more, and that user may be eliminated from the users to be notified. Once the user is eliminated, for example, when the administrator changes the setting information before the user completes the download of the setup driver due to problems, the user is not notified.

Thus, a function for setting an unconditional notification period defining a period for unconditionally notifying the change/update of the driver may be set.

Since the final notification has been performed (from notification date and time 503) until the unconditional notification period (predetermined period) elapses, regardless of performing the download in the past, the notification processing unit 421 performs the next notification. When the unconditional notification period elapses after the final notification has been performed, the next notification is not transmitted to the mail address 501 that has not downloaded in the past (the number of times of download 505 is "0").

As described above, by controlling whether the next notification is transmitted or not, based on the number of times of download 505 after the unconditional notification period has elapsed, unnecessary notifications to the user can be reduced.

As described above, the unique ID is applied to the URL to be notified to determine which user has downloaded, and then the change of the resource is notified only to the user who has downloaded the driver.

Further, when the download is performed from the same URL a plurality of times using the user information recorded in the user management table 403, it is determined that the user who is not registered in the user management table 403 has accessed the URL, and the display screen is changed.

More specifically, the notification destination registration screen is displayed and the notification destination information is input, so that change/update information about the setup driver can be subsequently notified to the user who has not been registered in the user management table 403.

The next notification is not transmitted to the user who is registered in the user management table 403 but has not downloaded for the predetermined period after the last notification, so that unnecessary notifications for the user who does not use the image forming apparatus 101 any more can be reduced.

When the information stored in the image forming apparatus 101 in addition to the information about the device driver is changed, the change may be notified to the user using the image forming apparatus 101 by a similar method to that of the device driver.

According to the present exemplary embodiment, the mail address is used as the address and the notification is transmitted by the mail, however, a path of a shared file or a facsimile number may be set as the address to transmit the notification via file transmission or facsimile transmission.

As described above, according to the present exemplary embodiment, by adding the unique ID to the URL to be notified to the user and determining which user has downloaded, the change of the resource can be notified to the user who has downloaded the driver.

Further, the user information recorded in the user management table 403 is used to change the display screen for the user who performs downloading from the same URL. More specifically, the notification destination registration screen illustrated in FIG. 10 is displayed to allow the user to input the notification destination information, so that the change/update information about the setup driver can also be notified to the user who is not registered in the user management table 403.

As described above, the system can be easily realized in which the setup file of the device driver for the image forming apparatus 101 registered in the storage region of the image forming apparatus 101 is provided for the user using the image forming apparatus 101 by downloading thereof from the web page provided by the image forming apparatus 101. When the setup file is changed, the change can be securely notified only to the users who need the notification.

Configurations and contents of various kinds of data described above are not limited thereto, and, according to the usage and purpose, various configurations and contents may be employed.

The present invention may be applied to a system including a plurality of devices and also an apparatus including one device.

The present invention is not limited to the above-described exemplary embodiments, and a variety of modifications, including any combination of exemplary embodiments, can be applied based on the scope of the present invention, and they are not excluded from an aspect of the present invention. In other words, the configurations in which above-described exemplary embodiments and modifications thereof are combined with each other are also included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-225735 filed Oct. 13, 2011, which is hereby incorporated by reference herein in its entirety.

What is claimed is:

1. An image forming apparatus comprising:
a receiving unit configured to receive, through an input unit, a plurality of addresses for transmitting mail including a URL of a web page provided by the image forming apparatus;
a notification unit configured to transmit the mail including the URL of the web page to the plurality of addresses received by the receiving unit;
a delivery unit configured to, in response to a download request from an external apparatus via the web page indicated by the URL, deliver to the external apparatus a setup file of a device driver for the image forming apparatus registered in a storage region of the image forming apparatus; and
a registration unit configured to allocate a unique ID to the each address and register the address, the ID, and information indicating whether the download has been requested and associate the address, the ID, and the information with one another,
wherein the addresses are input using an address book previously stored in the image forming apparatus,
wherein the notification unit is configured to transmit to the address the mail including the URL of the web page to which the ID allocated to the address is added, and
wherein the registration unit is configured to register, in association with the ID added to the URL, information indicating that the download has been performed in response to the download request from the external apparatus via the web page corresponding to the URL.

2. The image forming apparatus according to claim 1, wherein, when the information indicating that the download has been performed is registered in association with the ID added to the URL, the delivery unit is configured to transmit information to the external apparatus about a screen for newly inputting an address, and
wherein the registration unit is configured to register the newly input address.

3. The image forming apparatus according to claim 1, wherein, when the mail including the URL is transmitted by the notification unit, the registration unit is configured to delete the information registered in association with the ID applied to the URL indicating that the download has been performed.

4. The image forming apparatus according to claim 1, wherein, when the setup file is updated, the notification unit is configured to transmit to the address registered in the registration unit the mail including the URL to which the ID, which is registered in the registration unit in association with the address, is added.

5. The image forming apparatus according to claim 1, wherein, when the mail is transmitted, the notification unit is configured to check for each address whether information indicating that the download has been performed is registered, and
wherein for an address where no information indicating that the download has been performed is registered, the mail is not transmitted.

6. The image forming apparatus according to claim 1, wherein the registration unit is configured to register a date and time of the mail transmitted by the notification unit for each address, and
wherein, when the mail is transmitted, the notification unit is configured to check, for each address, the mail transmission date and time and whether the information indicating that the download has been performed is registered, and wherein for an address for which the information indicating that the download has not been performed since a predetermined period from the mail transmission date and time has elapsed is not registered, the mail is not transmitted to that address.

7. A method for controlling an image forming apparatus, the method comprising:

receiving, through an input unit, a plurality of addresses for transmitting mail including a URL of a web page provided by the image forming apparatus;

transmitting the mail including the URL of the web page to the plurality of addresses;

delivering, in response to a download request from an external apparatus via the web page indicated by the URL, to the external apparatus a setup file of a device driver for the image forming apparatus registered in a storage region of the image forming apparatus; and allocating a unique ID to the each address and registering the address, the ID, and information indicating whether the download has been requested and associate the address, the ID, and the information with one another, wherein the addresses are input using an address book previously stored in the image forming apparatus, wherein the transmitting comprises transmitting to the address the mail including the URL of the web page to which the ID allocated to the address is added, and wherein the registering comprises registering, in association with the ID added to the URL, information indicating that the download has been performed in response to the download request from the external apparatus via the web page corresponding to the URL.

8. A non-transitory computer-readable storage medium on which is stored a computer program for making a computer execute a method for controlling an image forming apparatus, the method comprising:

receiving, through an input unit, a plurality of addresses for transmitting mail including a URL of a web page provided by the image forming apparatus;

transmitting the mail including the URL of the web page to the plurality of addresses;

delivering, in response to a download request from an external apparatus via the web page indicated by the URL, to the external apparatus a setup file of a device driver for the image forming apparatus registered in a storage region of the image forming apparatus; and allocating a unique ID to the each address and registering the address, the ID, and information indicating whether the download has been requested and associate the address, the ID, and the information with one another, wherein the addresses are input using an address book previously stored in the image forming apparatus, wherein the transmitting comprises transmitting to the address the mail including the URL of the web page to which the ID allocated to the address is added, and wherein the registering comprises registering, in association with the ID added to the URL, information indicating that the download has been performed in response to the download request from the external apparatus via the web page corresponding to the URL.

* * * * *